Patented Oct. 15, 1946

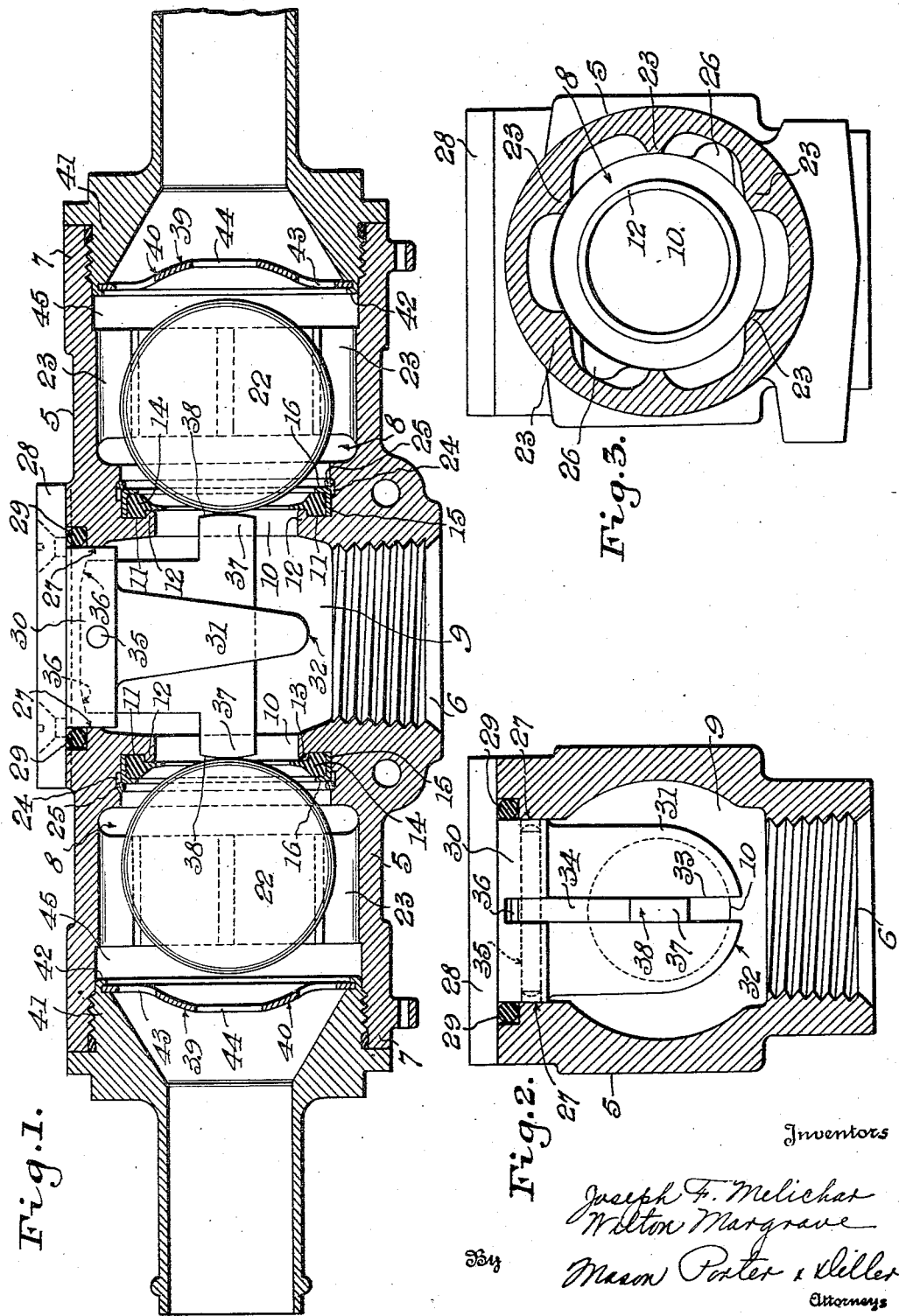

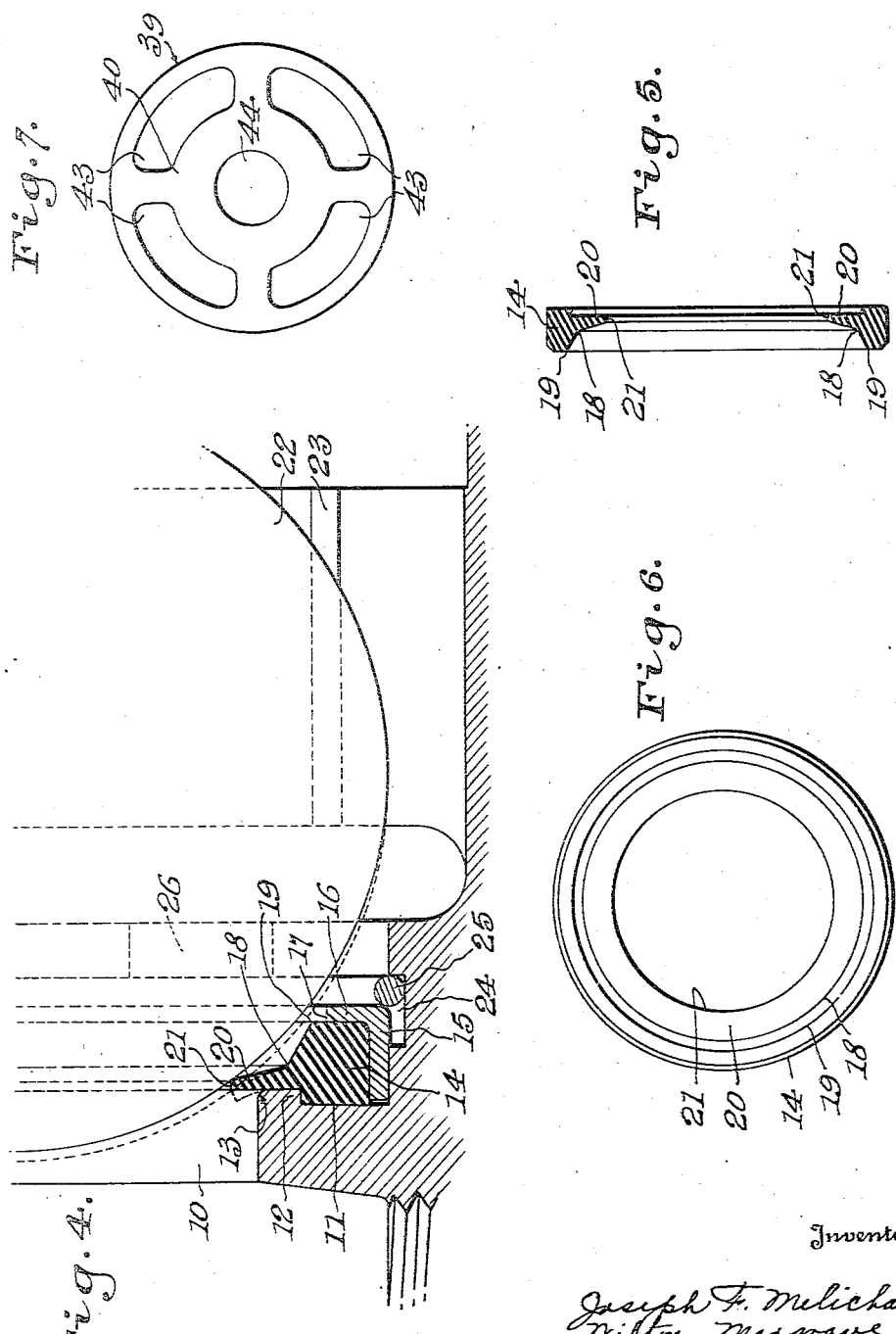

2,409,220

UNITED STATES PATENT OFFICE 2,409,220

SUMP SELECTOR VALVE

Joseph F. Melichar and Wilton Margrave, Cleveland, Ohio, assignors to The Parker Appliance Company, Cleveland, Ohio, a corporation of Ohio Application May 13, 1943, Serial No. 486,862

11 Claims. (Cl. 251—121)

The invention relates to certain new and useful improvements in sump selector valves adapted for use in fuel supply tanks of aircraft in the manner disclosed in U. S. Letters Patent 2,332,007, issued to Arthur L. Parker October 19, 1943.

In an airplane the fuel supply tank is mounted fixedly relative to the frame structure in such position that the longitudinal axis of the tank will be disposed substantially horizontally when the airplane assumes level flight. When the airplane is at rest on the ground, the tank is tilted upward so that the fuel lies at the back end of the tank, and the tank will remain tilted until the airplane has reached the desired altitude and assumes a level flight. During flight, the tank will be tilted more or less as the airplane moves upward or downward and during banking in the making of turns. In order to avoid the delivery of air into the engine fuel lines as a result of uncovering of a line inlet in the tank due to tilting of the tank, there is provided a plurality of fuel dispensing pipes which terminate adjacent the ends of the tank, or at widely spaced points in the tank, with which pipes is associated a sump selector valve mounted for tilting movement with the tank and which is so disposed that gravity-actuated valves therein will control the dispensing pipes whereby fuel will be supplied solely from the pipe leading to the lowermost position in the tank during its tilting movements. It is a purpose of the present invention to provide a novel improved form of sump selector valve adaptable for the above stated uses.

An object of the invention is to provide an improved seat and ball valve combination so constructed and arranged that the ball valve will have proper engagement with the seat, to cut off the flow of the liquid fuel, upon slight tilting of the valve casing from the horizontal when the seating component of the ball valve is considerably less than the weight of the ball valve.

A further object of the invention is to provide a baffle between the inlet port and the ball valve effective to direct the incoming fluid around the ball without impinging fully and directly against the ball, thereby preventing chattering of the unseated ball.

A further object of the invention is to provide a baffle of the character stated having openings therein for directing incoming fluid around the ball and in which there is included a central opening of limited area designed to cooperate with the first mentioned openings and the adjacent valve inlet opening in avoiding the provision of low pressure areas at the inlet side of the respective ball valve tending to hold the ball valve against the baffle during slight tilting of the valve structure.

A further object of the invention is to provide in a valve structure combination of the character stated a valve seat including dual seating portions one of which is very sensitive and efficient when the ball engages and is seated thereagainst with a very slight force, such as when the angle of tilt of the valve structure is very slight or when the suction pull is very slight, and the other of which is a bumper seat portion efficient when the ball engages and seats thereon at greater seating forces and which is so disposed relative to said sensitive seat as to prevent wedging of the ball in the sensitive seat.

A further object of the invention is to provide in a valve structure of the character stated and including a valve seat having a first engaged sensitive seat portion and a second engaged bumper seat portion, a seat mounting or keeper ring having a flange portion so disposed relative to said sensitive and bumper seat portions as to constitute a third engaged metal seat portion or stop shoulder effective to limit compression of the ball valve on the sensitive and bumper seats.

With the above and other objects in view that will hereinafter appear, the nature of the invention will be more fully understood by following the detailed description, the appended claims and the several views illustrated in the accompanying drawings.

In the drawings:

Figure 1 is a central longitudinal section illustrating the improved valve structure.

Figure 2 is a central vertical cross section of the valve structure illustrated in Figure 1, the center baffle being shown in elevation.

Figure 3 is a vertical cross section of the valve casing per se taken through one ball chamber thereof and looking toward the center of the casing.

Figure 4 is an enlarged fragmentary sectional view somewhat diagrammatically illustrating the manner in which a ball valve contacts the cooperating ring seat.

Figure 5 is a vertical cross section of one of the ring seats per se.

Figure 6 is a face view of the ring seat illustrated in Figure 5.

Figure 7 is a face view of one of the inlet baffles.

The improved sump selector valve comprises a casing 5 which is generally cylindriform in shape and open at both ends. The casing is provided centrally of its length with an outlet opening 6 which is disposed perpendicularly with respect to the longitudinal axis of the casing and opens downwardly in the manner clearly illustrated in Figure 1. Inlet openings are provided in the respective ends 7 of the casing, and within each end of the casing is formed a ball valve chamber 8, and a central flow chamber 9 being disposed in the center of the casing between said ball chambers and communicating therewith through circular openings 10.

It is to be understood that the respective ends 7 of the casing are adapted to be connected by ducts or pipe lines with the fuel tank of an airplane, said pipes or ducts opening into the tank at spaced points so that one at least thereof always will be connected with the fuel supply whereas the other may be open at times to air in the tank in the manner clearly disclosed in U. S. Letters Patent 2,332,007, issued to Arthur L. Parker, October 19, 1943, and hereinbefore referred to. The outlet opening 6 is adapted to be connected by a pipe or conduit with the booster pump usually provided, and through said pump with the engine to be supplied with fuel.

The casing wall in which each fuel supply or seat opening 10 is formed is provided endwise with a seat recess 11 which is undercut as at 12 to provide an overhanging shoulder, the inner edge corner of which is rounded as at 13 for a purpose that will later become apparent. A valve seat ring 14 formed of rubber or other equivalent yieldable material is mounted in each recess 11, being removably held therein by a metal mounting or keeper ring 15 having an inwardly directed keeper flange 16. It will be observed by reference to Figures 1 and 4 of the drawings that the flange 16 of the keeper ring is so disposed as to provide a rigid seating shoulder 17.

One of the yieldable seat rings 14 is illustrated in detail in Figures 5 and 6 of the drawings from which it will be observed that each ring includes an obtusely angularly recessed face portion 18 which results in the provision of a line contact bumper seat 19 and a relatively thin very flexible lip 20 which projects transversely inwardly beyond the diametrical limit of the respective opening 10. Each flexible lip is disposed to present a line contact seat shoulder 21 toward the respective ball chamber 8. Within each ball chamber 8 is provided a plurality of circumferentially spaced ball guide ribs 23 which are disposed parallel the axis of the casing and serve as guides for the ball valves 22 rollably mounted in the respective chambers 8. By reason of the particular mounting of the balls and the formation and mounting of the respective ring seats in the manner hereinbefore described and clearly illustrated in Figures 1 and 4, a ball valve rolling against the cooperating ring seat will first engage in line contact with the thin flexible lip 20 as at 21. If the tilt of the casing is very slight the liquid seal will be effected by line contact of the ball only with the lip 20, but when the degree of tilt of the casing is sufficient to cause the ball to deflect the lip 20 to a sufficient extent, the ball will next engage the less readily yieldable bumper seat shoulder 19, engaging in line contact therewith. This contact with the bumper seat supplements the seat sealing contact of the ball and avoids movement of the ball far enough into the respective seat to effect a wedging thereof within the lip 20. It will be observed by reference to Figures 1 and 4 of the drawings that the rigid seat shoulder 17 provided on the keeper ring flange 16 is so related to the bumper shoulder seat 19 as to act as a supplement therefor effective whenever tilting of the casing at an exaggerated angle forces the ball against the seat 19 with sufficient pressure to deform the shoulder 19 and permit the ball to come against the rigid stop 17 and thereby positively limit movement of the ball into the seat. From the foregoing it will be apparent that each ring seat equipment provides a first contacted very flexible line contact seat 21, a second contacted less yieldable bumper seat 19 and a third contacted rigid stop seat 17.

An annular recess 24 is provided beside each mounting ring 15 for the purpose of removably receiving a snap ring retainer 25 effective to secure the ring 15 in place in the manner clearly illustrated in Figures 1 and 4 of the drawings. A clearance 26 is provided in the casing wall in each chamber 8 so as to render the respective recess 24 accessible in a manner for facilitating removal of the respective snap ring retainer 25. See Figure 3.

At its central portion, directly over the outlet opening 6, the casing 5 is provided with an opening 27 which is closed by a removably mounted closure cap 28, said cap being secured fluid-tight against a recessed gasket 29 in the manner clearly illustrated in Figures 1 and 2. The cap includes a center boss or plug extension which depends in the casing opening 27, said boss being provided with a depending center baffle 31 which is slightly wider than the diameter of the casing openings 10 and is rounded as at 32 at its lower extremity on an arc the radius of which is slightly greater than the radius of said openings 10. The baffle 31 is provided with a centrally longitudinally disposed slot 33 and a pendulum member 34 is pivotally mounted as at 35 in said slot. The pendulum member is provided at its upper end with shoulders 36 effective to limit swinging movement of the member in the central vertical plane including the axis of the casing, and at its lower end the pendulum member 34 is provided with endwise extensions 37 which include arcuate end faces 38 disposed along the center of the casing in position for contacting the ball valves 22 in the manner clearly illustrated in Figure 1. It will be observed by reference to Figure 1 that the pendulum member extensions are so spaced that they will engage with the ball valves 22 and prevent seating of both balls at any given time.

In order to prevent direct, full force impingement of the incoming fuel with the ball valves 22, an inlet baffle 39 is mounted at each end of the casing in the manner clearly illustrated in Figure 1. Each inlet baffle includes a convex center portion conforming generally to the curvature of the adjacent portion of the respective ball valve, and each baffle 39 is mounted in an adapter 41 threadably mounted in the respective end of the casing 5 and having a recess therein for receiving the peripheral edge of the baffle 39, the metal defining the recess being upset as at 42 to retain the baffle in assembly with the respective adapter. Each baffle is equipped with outer openings disposed adjacent the diametric limit of the adjacent ball, and also with a center opening 44 of limited area which permits a limited amount of direct impingement of the incoming fuel with the respective ball valve 22 but not objectionable full force impingement such as would cause the ball to partake of violent uncontrolled movements in its chamber. The provision of the particular arrangement of apertures 43 and 44 avoids the provision of low pressure areas at the points 45 in the respective ball valve chambers which would tend to hold the ball against the respective baffle during slight tilting of the casing.

In use, when the valve casing is tilted so as to cause one ball valve 22 to roll toward the respective end baffle 39 and the other ball valve to roll toward the respective ring seat 14, the ball 22 rolling toward said seat ring will first have a light engagement with the very flexible lip 20, engaging the same in line contact as at 21 in the manner indicated in Figure 4. If the tilt of the casing is very slight the whole seal will be effected by the line contact at 21 and the ball will remain out of contact with the bumper seat 19. If the tilt of the casing is sufficient to cause the ball to gravitate against the lip 20 with sufficient pressure to deflect or bend the very flexible lip in the manner indicated in dotted lines in Figure 4, the ball will next engage in line contact at 19 with the bumper seat. As previously described, the lip 20 is more readily yieldable than the bumper seat 19. If the degree of tilt of the casing is considerable the ball will slightly deform the bumper seat 19 as well as the very flexible lip 20, but the bumper seat will assure against movement of the ball into the lip far enough to wedge in or damage said lip. Avoidance of any wedging of the ball in the lip 20 is additionally assured by provision of the positive stop seat 17 which will become effective after slight deformation of the bumper seat 19 to positively limit movement of the respective ball 22 into the seat opening 10. The rounding of the inner edge portion of the shoulder 12 as at 13 assures against damaging of the thin flexible lip 20 by any pinching action, and flexure of the lip in engagement with the ball valve can be continuously effected without danger of damaging the lip by bending against a sharp opposing edge portion. The end baffles 39 serve to direct the incoming liquid fuel around the ball valves 22 so as to prevent objectionable full direct impingement of the incoming liquid fuel with the ball valves such as would cause chattering of the valves. The limited area central openings provide just enough direct center contact of the incoming liquid fuel with the ball valves 22 to avoid provision of objectionable low perssure areas at 45 which would tend to hold the ball valves against the inlet baffles.

The partition or center baffle 31, proportioned in the manner stated, covers the valve seat openings 10 in a manner for diverting or guiding the incoming liquid fuel passing either ball valve 22 laterally and downwardly through the outlet opening 6. In this manner, incoming fuel will not impinge upon the seated ball valve and tend to unseat the same. While the center baffle 31 thus prevents the incoming liquid fuel passing one unseated ball valve from directly engaging and effecting an unseating of the other seated ball valve, yet it does not obstruct the proper and free flow of the incoming liquid fuel through the unseated ball valve associated seat to the outlet opening 6. The shouldering of the ring seat 14 in the manner clearly illustrated in Figure 5 for engaging under the undercut or overhanging shoulder 12 serves to support the thin flexible lip 20 against being deformed radially by ball contact or ring pressure.

It is to be understood that the form of our invention herein shown and described is to be taken as a preferred example of the same and that various changes in the shape, size, and arrangement of parts may be resorted to without departing from the spirit of our invention or the scope of the appended claims.

We claim:

1. In a valve, the combination of a ring seat of resilient yieldable material and a valve member movable into and out of engagement with said ring seat for controlling passage of fluid therethrough, said seat including a first engageable thin bendable annular lip engageable by the valve member when moved against the ring seat and effective to provide an efficient line contact seal at light pressure contacts of the valve member with the seat ring, and a spaced second engageable annular yieldable bumper seat portion engageable by the valve member after a bending of the lip by valve member engagement and effective to provide an efficient seal at heavier pressure contacts of the valve member with the seat ring and to limit the amount of displacement by bending of the first engaged lip by said valve member.

2. In a valve, the combination of a ring seat of resilient yieldable material and a valve ball movable into and out of engagement with said ring seat for controlling passage of fluid therethrough, said seat including a first engageable annular thin lip disposed transversely with respect to the axis of the ring seat and engageable by the valve ball when moved against the ring seat and effective to provide an efficient seal at light pressure contacts of the valve ball with the seat ring, and a spaced second engageable annular bumper seat portion engageable by the valve ball and effective to provide an efficient seal at heavier pressure contacts of the valve ball with the seat ring and to limit the movement of the ball within the said lip and thereby assure against wedging of the ball in the seat ring.

3. In a valve, the combintaion of a ring seat of resilient yieldable material and a valve ball freely rollable in a generally horizontal direction into and out of engagement with said ring seat for controlling passage of fluid therethrough, said seat including a first engageable annular thin lip disposed transversely with respect to the axis of the ring seat and engageable by the valve ball when moved against the ring seat and effective to provide an efficient seal at light pressure contacts of the valve ball with the seat ring, a spaced second engageable annular bumper seat portion engageable by the valve ball and effective to provide an efficient seal at heavier pressure contacts of the valve ball with the seat ring and to limit the movement of the ball within said lip and thereby assure against sticking of the ball in the seat ring, and a rigid seat shoulder disposed in cooperative relation to said bumper seat for being engaged by said ball and providing a third engageable non-yielding seat definitely limiting movement of the ball valve into the yieldable ring seat.

4. In a valve, a ring seat of rubber or equivalent resilient yieldable material disposed with its axis in a generally horizontal position, a ball valve, and means supporting and guiding the ball for free movement along the axis of the seat ring for cooperation therewith, said ring having an annular thin lip disposed transversely with respect to the axis of the ring seat and engageable by the ball and alone effective to form an efficient seal when only slight gravitational or other pull is exerted on the ball, and a spaced annular bumper seat portion engageable by the ball when greater than slight gravitational pulls are exerted on the ball thereby to supplement the seal effected by said lip.

5. In a valve, a ring seat of rubber or equivalent resilient yieldable material disposed with its axis in a generally horizontal position, a ball valve, and means supporting and guiding the ball for free movement along the axis of the seat ring for cooperation therewith, said ring having an annular thin lip disposed transversely with respect to the axis of the ring seat and engageable by the ball and alone effective to form an efficient seal when only slight gravitational or other pull is exerted on the ball, and a spaced annular bumper seat portion engageable by the ball when greater than slight gravitational pulls are exerted on the ball thereby to supplement the seal effected by said annular thin lip, said bumper seat portion being disposed adjacent said lip so as to be engaged by the ball after a predetermined limited movement of the ball within said lip so as to assure against wedging of the ball within said annular thin lip.

6. In a valve, a casing having a cross wall having a circular fluid passing opening therein and a ring seat receiving recess, a ring seat of rubber or equivalent yieldable material mounted in said recess, a ball valve, means for guiding said ball for movement along the axis of said opening toward and from said ring seat, said seat having an annular thin lip extending transversely at said opening and inwardly beyond the diametric limit of said opening and engageable by the ball and alone effective to form an efficient seal upon light pressure contacts of said ball, and a spaced annular bumper seat portion engageable by the ball upon heavier pressure contacts of the ball with said seat, and a flanged metal ring for removably retaining the seat in said recess, the ring flange being disposed in cooperative relation to said lip and bumper seat for being engaged by the ball after it has successively engaged the lip and the bumper seat in the order stated and compressed the bumper seat a predetermined limited amount, thereby to positively limit the degree of deformation of the seat by the ball and prevent wedging of the ball in said lip.

7. A structure as defined in claim 6 in which the ring seat receiving recess is undercut so as to provide a shoulder disposed to overhang a portion of the seat from which the thin annular lip extends and support the lip against inward distortion.

8. A structure as defined in claim 6 in which the casing is provided with an annular recess disposed beside the flanged metal ring, and in which there is included a snap ring removably mounted in said annular recess and removably securing said metal ring in place in the ring seat receiving recess.

9. In a valve, the combination of a ring seat formed of resilient material and having a plurality of annular seat edges, said edges being of different diameters and flexible and resilient and one said edge being more flexible than the other, and a freely rolling ball valve rollable by gravity into and out of engagement with said ring seat and effective for engaging in seat sealing contact with the more flexible seat edge upon only slight gravity action rolling thereof toward said ring seat and with both said seat edges upon more pronounced gravity action rolling thereof toward said seat.

10. In a valve, the combination of a ring seat formed of resilient material and having a plurality of concentrically arranged and successively engageable first and second seat edges, said seat edges being yieldable and resilient and said first seat edge being more yieldable than said second seat edge, and a freely rolling ball valve rollable by gravity into and out of engagement with said ring seat and effective for engaging in seat sealing contact with said first seat edge upon only slight gravity action rolling thereof toward said ring seat and with both said first and second seat edges upon more pronounced gravity action rolling thereof toward said seat ring.

11. In a valve, the combination of a casing structure having a flow passage therethrough surrounded by a seating portion, a valve member movable between passage sealing and passage opening positions and including a seating portion opposing the first mentioned seating portion, one said seating portion having a seating ring of resilient yieldable material presented for engagement with the other seating portion and including a first engageable thin bendable annular lip effective to provide an efficient line contact seal at light pressure contacts of the ring with said other seating portion, and said ring also including a spaced second engageable annular yieldable bumper seat engageable with said other seating portion after an amount of bending of said lip and effective to provide an efficient seal at heavier pressure contacts of the ring with said other seating portion.

JOSEPH F. MELICHAR.
WILTON MARGRAVE.